(12) United States Patent
Sun et al.

(10) Patent No.: US 12,292,264 B2
(45) Date of Patent: May 6, 2025

(54) FRUSTUM EMBEDDED FABRICATED COMPOSITE PROTECTIVE STRUCTURE

(71) Applicant: Qingdao University of Technology, Qingdao (CN)

(72) Inventors: Yuyan Sun, Qingdao (CN); Ziguo Wang, Qingdao (CN); Zuquan Jin, Qingdao (CN); Yong Yu, Qingdao (CN); Xiaomei Wan, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 18/164,457

(22) Filed: Feb. 3, 2023

(65) Prior Publication Data

US 2023/0194215 A1    Jun. 22, 2023

Related U.S. Application Data

(63) Continuation of application No. PCT/CN2022/074353, filed on Jan. 27, 2022.

(51) Int. Cl.
*F41H 5/007* (2006.01)
*F41H 5/04* (2006.01)
(Continued)

(52) U.S. Cl.
CPC ........... *F41H 5/007* (2013.01); *F41H 5/0435* (2013.01); *F41H 5/0492* (2013.01); *F41H 5/226* (2013.01); *F41H 5/24* (2013.01)

(58) Field of Classification Search
CPC ........ F41H 5/0492; F41H 5/24; F41H 5/0421; F41H 5/0428
See application file for complete search history.

(56) References Cited

U.S. PATENT DOCUMENTS 11,131,527 B1 *   9/2021  Kruft ..................... B32B 5/022
2009/0078109 A1   3/2009  Baxter et al.
(Continued)

FOREIGN PATENT DOCUMENTS

CN    104097363 A    10/2014
CN    109141123 A    1/2019
(Continued)

OTHER PUBLICATIONS

Internation Search Report of PCT/CN2022/074353, Mailed May 5, 2022.

*Primary Examiner* — J. Woodrow Eldred

(57) ABSTRACT

A frustum embedded fabricated composite protective structure is provided, including a restraint frame, a back plate, an infill block and a buffer block. The restraint frame is provided with a plurality of mounting holes matching with the shape of the infill block, the restraint frame is arranged on the back plate, the infill block is in a frustum shape. The buffer block and the infill block are installed in the mounting hole of the restraint frame, the buffer block is arranged on the smaller end of the infill block, and the infill block is wedged into the mounting hole of the restraint frame through a wedge surface mating. Because this protective structure is assembled by multiple restraint frames and infill blocks, under the prestress restraint of partition blocks, the damage range after penetration or explosion will be significantly reduced, and it can withstand multiple blows.

7 Claims, 7 Drawing Sheets

(51) Int. Cl.
*F41H 5/22* (2006.01)
*F41H 5/24* (2006.01)

(56) References Cited

U.S. PATENT DOCUMENTS

2013/0199712 A1* 8/2013 Gendlin .................... B32B 3/12
156/247
2014/0208929 A1* 7/2014 Willson ................ F41H 5/0492
164/75
2016/0363418 A1* 12/2016 Sorensen .............. F41H 5/0492

FOREIGN PATENT DOCUMENTS

CN 111705993 A 9/2020
CN 212512712 U 2/2021

* cited by examiner

FRUSTUM EMBEDDED FABRICATED COMPOSITE PROTECTIVE STRUCTURE

CROSS-REFERENCE TO RELATED APPLICATIONS

This application is a continuation of International Application No. PCT/CN2022/074353 with a filling date of Jan. 27, 2022, designating the United states, now pending, and further claims to the benefit of priority from Chinese Application No. 202110211159.8 with a filing date of Feb. 25, 2021. The content of the aforementioned applications, including any intervening amendments thereto, are incorporated herein by reference.

TECHNICAL FIELD

The disclosure relates to a frustum embedded fabricated composite protective structure.

BACKGROUND

With the upgrading and development of weapons and equipment, as well as the severe situation of terrorist explosion attacks, the protection performance of armor equipment and protective structures is facing more severe challenges, it is urgent to develop lighter and more effective armor and protective structures. Ceramic materials such as $Al_2O_3$, $B_4C$, SiC, $TiB_2$ and AlN have the characteristics of low density, high hardness, high compressive strength, etc., which can effectively passivate and abrade projectiles, and can significantly improve the anti-penetration of armor. Concrete is one of the most widely used civil engineering materials, widely used in military and civil air defense projects, and also a very important material for nuclear containment. However, ceramics and concrete, as brittle materials with low toughness and low tensile strength, are prone to brittle fracture and collapse under the impact of projectiles, and anti-penetration performance of which is seriously affected. When the bullet proof layer structure of ceramic or concrete is constrained by the ductile steel pipe, fiber reinforced material and other partition blocks, its ballistic performance is obviously better than that of the bullet proof layer under the unconstrained condition, and the smaller the diameter of the foundation unit constrained by the partition block, the better its anti-penetration and anti-multiple strike performance. This is because its radial expansion and crack propagation are limited under the constraint, which greatly improves its strength and toughness, and significantly improves its anti-penetration performance.

The research shows that the anti-penetration performance of ceramic materials can be further improved by prestressing on the basis of partition block constraint. It is found from the tests that under the restraint of the lateral plate and the biaxial prestressed, the static and dynamic strength and hardness of the ceramic target grow with the increase of the prestress. The prestress applied to the ceramic target can counteract the local impact transient tensile stress of the projectile, and effectively inhibit the initiation and propagation of cracks in the target. Even if the ceramic interior breaks or cracks under high-speed impact, the crack blocks are squeezed tightly, with only cracks but no expansion, which makes the interior of the broken ceramic region have greater penetration resistance, effectively improving the anti-penetration and anti-impact performance of the ceramic. Although the research on anti-penetration performance of concrete under prestressed constraint condition is relatively rare, the prestressed constraint effect of partial block is also applicable to brittle materials such as concrete and glass.

The mechanical extrusion method and the hot charging method are mainly used for the prestress restraint of the partition block ceramics. The mechanical extrusion method is to push the side plate to directly extrude the side of the ceramic plate in the inner direction of the ceramic panel, and apply transverse prestress to the ceramics; the hot charging method is to assemble the ceramic blocks and metal restraint rings with a surplus difference under high temperature, and compress the ceramics to apply prestress after the overall cooling of the metal with a larger thermal expansion coefficient and faster shrinkage. For example, the Chinese patent application with application number 201810777211.4 discloses a constrained ceramic-metal composite bulletproof armor plate and its preparation method. However, it is difficult to apply prestress to ceramic materials by these two methods, and it is more difficult to conduct prestress restraint on brittle materials such as concrete and glass with poor heat resistance by partial blocks. The Chinese patent application with application number 202010591444.2 discloses a prestressed restraint block for composite armor structure, which is wedged by matching the frustum filling body of the frustum with the frustum surface of the restraint ring, so that it is easier to apply radial prestress to the filling body, and biaxial prestress can be applied to ceramic, concrete, glass and other filling materials at room temperature. If the third direction prestress is applied to the restraint block on the basis of biaxial prestress, its ballistic performance will be greatly improved.

At present, prestressed concrete is widely used in large-span structures, and the commonly used prestress methods are pre-tensioning method and post-tensioning method, both of which apply prestress through the rebound of pretensioned reinforcement bar. Pre-tensioning method is applicable to small and medium-sized components, which is relatively easy to apply prestress to small size concrete components, but it is difficult to achieve confining prestress constraint on multiple small size component composite structures. Once the prestress is applied, the prestress cannot be adjusted again. Post-tensioning method is generally used for large components, prestress may have a counteraction when prestressed concrete is prone to collapse and splash in a large area under strong dynamic load of explosion or penetration. When applied to small size components, it is difficult to arrange the prestressed reinforcement bar, even if the prestressed reinforcement bar is well arranged, the short reinforcement bar would lead to a large loss of prestress. So it is difficult to control the prestress applied to the materials. In addition to the pre-tensioning method and post-tensioning method, the expansion concrete can also produce prestress inside the material, and the magnitude of prestress caused by expansion concrete is 0.17 MPa~3.45 MPa, due to the small prestress, it is mostly used for shrinkage compensation and self-stressing concrete, and generally not used as the prestress loading mode of concrete structures. Therefore, it is difficult to achieve the partial block prestress constraint by using the above prestress methods. At present, large doors, slabs, walls and other protective structures are mostly reinforced concrete or steel plate-concrete structures, and there is no concrete protective structure such as doors, slabs, walls and other concrete protective structures with fabricated partition prestressed restraints.

SUMMARY

The disclosure solves the deficiencies of the prior art and provides a frustum embedded fabricated composite protective structure. The disclosure presses the infill blocks made of concrete, ceramics, glass and other materials into the hoops made of metal or fiber reinforced polymer or into each lattice hoop of the restraint frame. The hoop applies two-dimensional or three-dimensional prestress to the infill blocks through the taper wedge method to form a partition block prestress restraint and fabricated composite protective structure.

The disclosure adopts the following technical solutions:

A frustum embedded fabricated composite protective structure, including a restraint frame, a back plate, an infill block and a buffer block, wherein the restraint frame is provided with a plurality of through holes matching the size of the infill block to form mounting holes, the restraint frame is arranged on the back plate, the infill block is in a frustum shape, the buffer block is arranged on the smaller end of the infill block, and the buffer block and the infill blocks are installed in the mounting holes of the restraint frame, and the infill block is wedged into the mounting hole of the restraint frame through a wedge surface mating, while the buffer block is constrained at a bottom of the mounting hole, and the infill block, and the buffer block and the back plate are fastened by fasteners.

In some embodiments, the restraint frame is formed by connecting the outer walls of a plurality of hoops, and the inner cavity of each of the plurality of hoops forms the mounting hole.

In some embodiments, the shape of infill block is a frustum of hexagonal pyramid, a frustum of regular pyramid, a frustum of cone or a frustum of regular twelve pyramid. When the infill block is the frustum of hexagonal pyramid, the restraint frame is connected by a plurality of hexagonal hoops to form a honeycomb type.

In some embodiments, a cover plate is arranged on an opening side of the restraint frame, the restraint frame is clamped between the back plate and the cover plate; the fasteners comprise bolts and nuts, and at least one bolt hole penetrates through the cover plate, the infill block, the buffer block and the back plate; and the cover plate and the back plate fixedly connect the infill block and the buffer block with each other through the bolts and the nuts. With the above structure, the prestress between the back plate and the infill block and the prestress along the direction perpendicular to the flat top of the infill block can be adjusted by the tightness of the bolts. The strength of the infill block increases with the increase of the prestress.

In some embodiments, the gap between the hoops is filled with a gap filler. The gap filler may be used materials such as concrete or fiber reinforced polymer. On the one hand, the gap filler can connect adjacent hoops, and on the other hand, the integrity of the restrained frame can be improved.

In some embodiments, an opening side of the restraint frame is provided with a cover plate, the restraint frame is clamped between the back plate and the cover plate; the fasteners comprise bolts and nuts, and at least one bolt hole penetrates through the cover plate, the gap filler, and the back plate; the cover plate, the gap filler and the back plate are fixedly connected with each other through the bolts and the nuts.

In some embodiments, the fasteners comprise bolts and nuts, at least one of the bolts is embedded in the infill block, and a corresponding bolt hole is provided to penetrate the buffer block and the back plate, the bolt passes through the bolt hole reserved in the back plate, and the infill block, the buffer block and the back plate are fixedly connected with each other.

In some embodiments, the infill block is a single-layer or multi-layer structure. The infill block is composed of one or more materials from ceramics, concrete and glass, and an outer surface of the infill block is wrapped with fiber reinforced polymer or metal plate to form a surface reinforcement layer. As the frustum of ceramic, concrete and other materials is prone to local damage in the corner area of the infill block in contact with the hoops during the process of pushing into the hoops, fiber reinforced polymer can be wrapped on the surface of the infill block or metal plate materials can be provided for surface reinforcement before the infill block is pushed into the hoops to prevent damage or delamination due to excessive local stress during the pushing process. An opening side of the restraint frame is provided with a cover plate, the restraint frame is clamped between the back plate and the cover plate; the fasteners comprise bolts and nuts, and at least one bolt hole is provided to penetrate edge areas of the cover plate and the back plate; the cover plate and the back plate are fixedly connected with each other through the bolts and the nuts, and the cover plate and the infill block are bonded by a binder.

In some embodiments, inclined angles of the infill block and the hoop matching with the infill block ranges from 0.5° to 10°. Preferably 1° to 4°, the inclined angle here is referred to the included angle between the vertical direction and the generatrix of the outer wall of the frustum of the infill block and the generatrix of the inner wall of the hoop, or the included angle between the vertical direction and the pyramidal line of the outer wall of the frustum and the pyramidal line of the inner wall of the hoop.

In some embodiments, a thickness of the infill block decreases from the center of the restrained frame to the periphery in a parabola or linear form, and a thickness of the buffer block increases correspondingly with the decrease of the thickness of the infill block, so that a total thickness of the infill block and the buffer block in each mounting hole matches a depth of the mounting hole. By changing the thickness of the infill block, the infill block in the middle of the whole structure of the device is thicker than the infill blocks around. In this way, the bending moment of the structure is reduced from the mid-span region to the surrounding area after being subjected to explosion or strong dynamic load outside, which is conducive to saving costs and improving the utilization rate of materials.

The advantageous effects of the disclosure:

Compared with the prior art, the disclosure enables the hoop restraint infill block to have a self tightening function through the hoop restraint principle, which can greatly improve the protection effect when the device is used as a protective structure, and the device presses the infill block into the hoop in the restraint frame, which can control the size of the confining prestress by controlling the pressing depth during assembly, so as to optimize the anti-penetration and anti-explosion performance of the infill block. At the same time, the device can adjust the prestress between the back plate and the infill block and the prestress along the direction perpendicular to the flat top of infill block by tightening the bolts. The strength of the infill block increases with the increase of prestress. In the device, the infill block can be made of concrete, ceramics or glass, and the hoop can be made of metal or fiber reinforced polymer. Therefore, the hoop can easily apply prestressing in the radial and vertical direction on the infill block at room temperature, so as to restrain the crack growth of the infill block effectively, improve the anti-penetration performance of the whole structure, which is suitable for applying prestressing on protective components of various sizes. The restraint frame adopts a combination of multiple hoops. When the restraint frame structure is damaged, the rapid disassembly and repair of the restraint frame can be achieved by replacing the hoops. In addition, because the infill block is frustum shaped, the outer diameter of the bottom surface of the infill block and the inner diameter of the mounting hole of the hoop have greater tolerance, which can allow greater processing errors. Compared with other assembly modes, it is more environmentally friendly and easier to achieve, and it is easier to apply prestress or adjust the prestress. Prestress of a single hoop to confine infill block has excellent local anti-impact performance, while the honeycomb confined frame composed of multiple hoops has excellent integrity and bending resistance, showing very good overall performance. As the infill block is pushed into the hoop to form a door, plate, wall and other plate structures, the confining pressure prestress restraint can greatly improve the compressive strength of the infill block, correspondingly improve the compressive strength of the compression area of the plate, and improve the overall bending strength and bending stiffness of the plate, making the structure more excellent in resisting the overall effect loads such as explosion impact.

To sum up, this fabricated composite protective structure is assembled by a restraint frame and multiple infill blocks. The prestress restraint effect of partition blocks can improve the anti-penetration and anti-explosion performance of the structure, greatly reduce the damage range of penetration or explosion, and can withstand multiple strikes. In the case that only one infill block is damaged, it is not necessary to replace other infill blocks. It only requires to take out and replaces the damaged infill block, which is more cost-saving than replacing the entire large-area infill block. In addition, when the infill block is damaged, it can be removed from the large port of the hoop to quickly repair and replace the damaged component. In view of these advantages, the disclosure has broad application prospects in island reef protection structures, aircraft hangars, missile well covers, ships, armed helicopters, armored vehicles, tanks and other protection fields.

Numbers marked in the figures: 1. infill block; 11. bolt holes; 2. restraint frame; 3. buffer block; 4. cover plate; 5. back plate; 6. bolts; 7. gap filler; 8. bolt anchor; 9. nut.

DETAILED DESCRIPTION OF THE EMBODIMENTS

Several embodiments of the disclosure are described in detail below according to the drawings.

Embodiment 1

Figure 1:
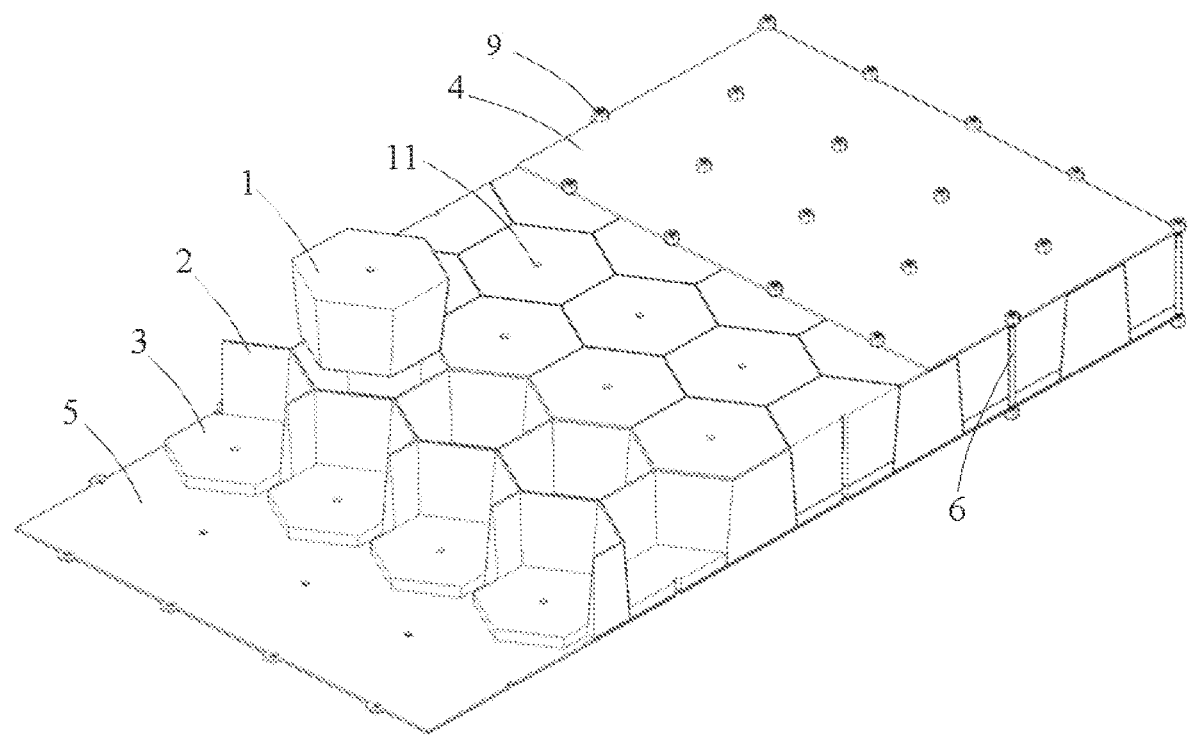
FIG. 1 is an internal structure assembly diagram of embodiment 1 of the present disclosure.

In this embodiment, the infill block 1 is an infill block 1 in the shape of frustum of a hexagonal pyramid. The restraint frame 2 is a honeycomb type restraint frame 2, the honeycomb type restraint frame 2 is composed of multiple hoops in the shape of frustum of a hexagonal pyramid, and the infill block 1 in the shape of frustum of a hexagonal pyramid and the restraint frame 2 constitute the device shown in FIG. 1. The hoop is anchored on the back plate 5 by bolts or connected with the back plate 5 by welding. At the bottom of mounting hole of each hoop, a buffer block 3 made of elastic and buffering materials such as foam aluminum and foam polymer is filled, and then the infill block 1 is pressed into the hoop in the restraint frame 2, and the lateral confining prestress of infill block 1 is controlled by controlling the pressing depth, such that the anti-penetration and anti-explosion performance of infill block 1 is optimized.

Figure 2:
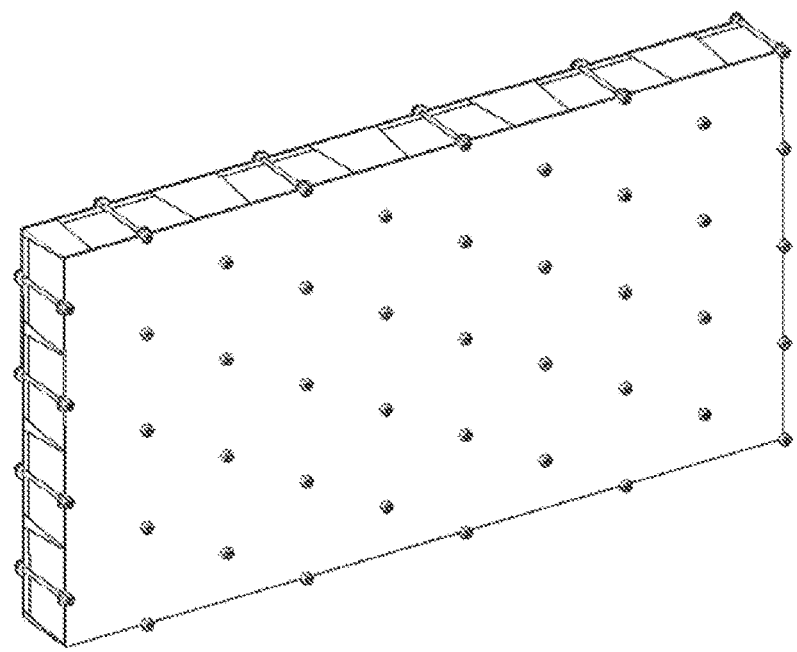
FIG. 2 is an external structure diagram of embodiment 1 of the present disclosure.

The cover plate 4 is covered on the restraint frame after all infill blocks 1 are pressed into the restraint frame 2. The reserved bolt holes 11 on the back plate 5, the buffer block 3, the infill block 1 and the cover plate 4 are used to combine the components of the back plate 5, the restraint frame 2 and the cover plate 4 into an integral structure through bolts, as shown in FIG. 2. By adjusting the tightness of the bolts, the prestress in the direction perpendicular to the flat top of infill block 1 can be adjusted, so that the three-dimensional prestress can be achieved for infill block 1, and the ballistic and impact resistance of the infill block 1 can be enhanced. When the structure is damaged, it can be quickly disassembled and repaired.

Embodiment 2

Figure 3:
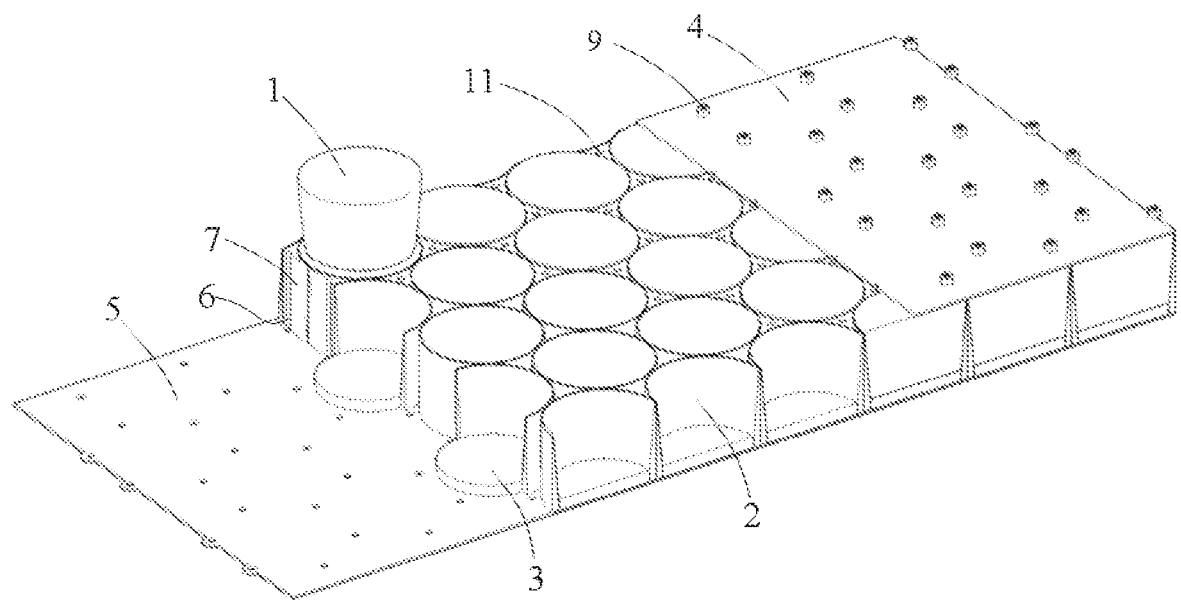
FIG. 3 is an internal structure assembly diagram of embodiment 2 of the present disclosure.
Figure 4:
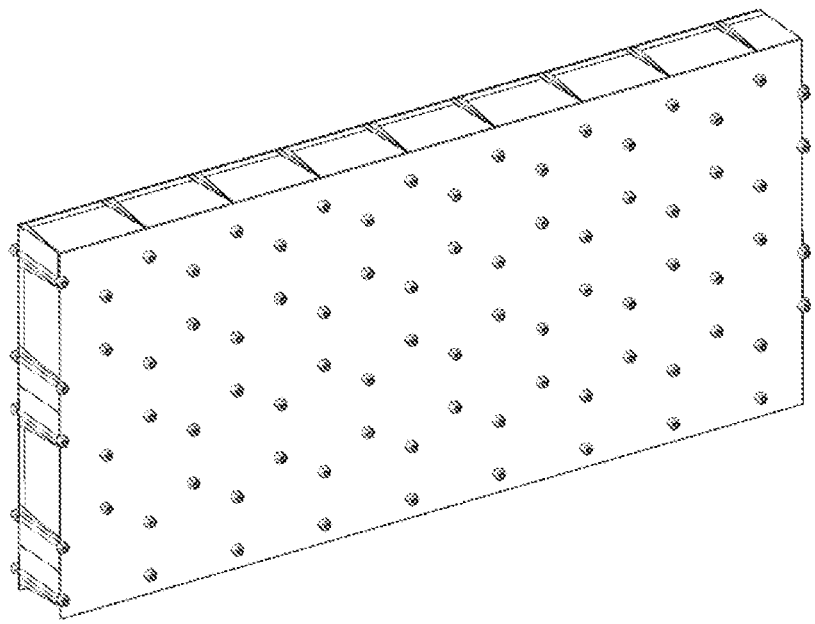
FIG. 4 is an external structure diagram of embodiment 2 of the present disclosure.

As shown in FIG. 3, the difference between this embodiment and Embodiment 1 lies in that in this embodiment, the infill block 1 is an infill block 1 in the shape of frustum of a cone, and the hoop of the restraint frame 2 is a hoop in the shape of frustum of a cone. When the infill block 1 in the shape of frustum of a cone is assembled, there is a gap between the hoops, so the gap filler 7 should be filled between the hoops. The gap filler 7 may be materials such as concrete, fiber reinforced polymer or foam aluminum and other materials, and the integral structure assembled by the back plate 5, the cover plate 4, the restraint frame 2 and the infill block 1 in the shape of frustum of a cone is shown in FIG. 4.

Embodiment 3

Figure 5:
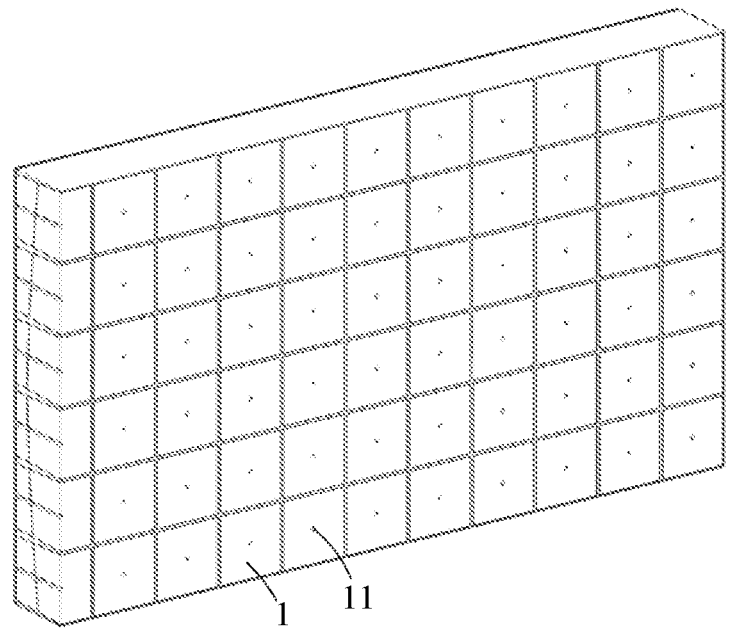
FIG. 5 is an internal structure assembly diagram of embodiment 3 of the present disclosure.
Figure 6:
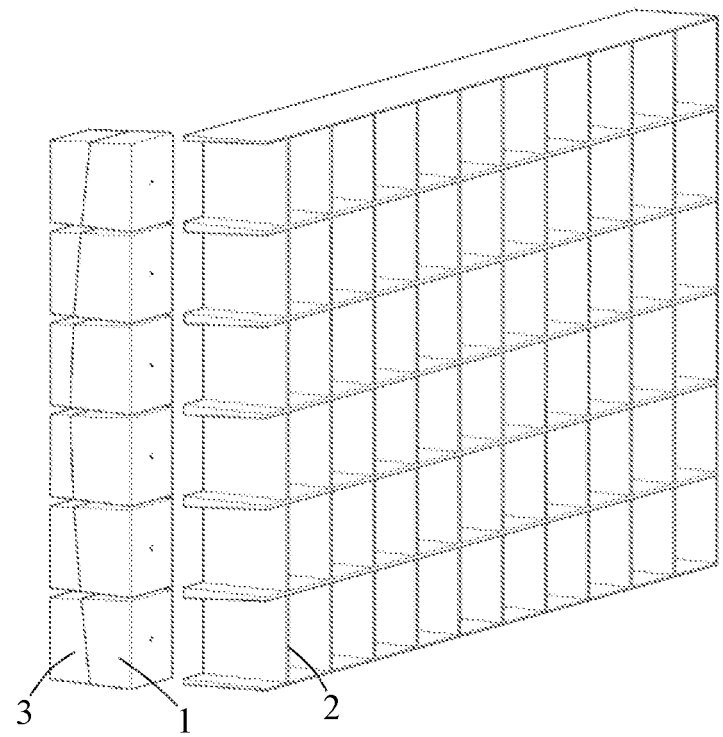
FIG. 6 is the structural diagram of the restraint frame, the frustum filler and the buffer block in embodiment 3 of the present disclosure.

As shown in FIG. 5 and FIG. 6, this difference between Embodiment 1 and this embodiment lies in that the infill block 1 in this embodiment is an infill block 1 in the shape of frustum of a regular pyramid. In order to fit the side surface of the frustum of a regular pyramid, the hoop is formed by connecting four wedge-shaped side plates with linearly varying thickness or by using equal-thickness side plates placed according to the inclination of the side surface of the frustum of the regular pyramid.

When this embodiment is applied to a protective door, panel or wall structure, the boundaries around the door, panel or wall structure are generally constrained such that the bending moment of the overall structure of this device generally decreases from the mid-span region to the periphery after being subjected to strong dynamic load such as explosion or penetration. In order to improve material utilization, the thickness of the infill block in this embodiment decreases from the center of the restrained frame to the periphery in a parabola or linear form, or varies according to the magnitude of the bending moment. The thickness of the buffer block increases with the decrease of the thickness of the infill block, so that the total thickness of the infill block and the buffer block in each mounting hole matches the depth of the mounting hole. The buffer block use aluminum foam, honeycomb material, polymer flexible material as cushioning layer to absorb energy such as shock waves and reduce damage to people and objects behind the door, panel or wall. The back plate 5 is welded or bolted to the restraint frame 2. To further increase the protective effect, panel restraint can be added by fastening the back plate 5 and panel with bolts to further apply prestress in the direction of the bolt axis to the infill block 1 to achieve three-dimensional prestress restraint and increase the protective performance.

Embodiment 4

Figure 7:
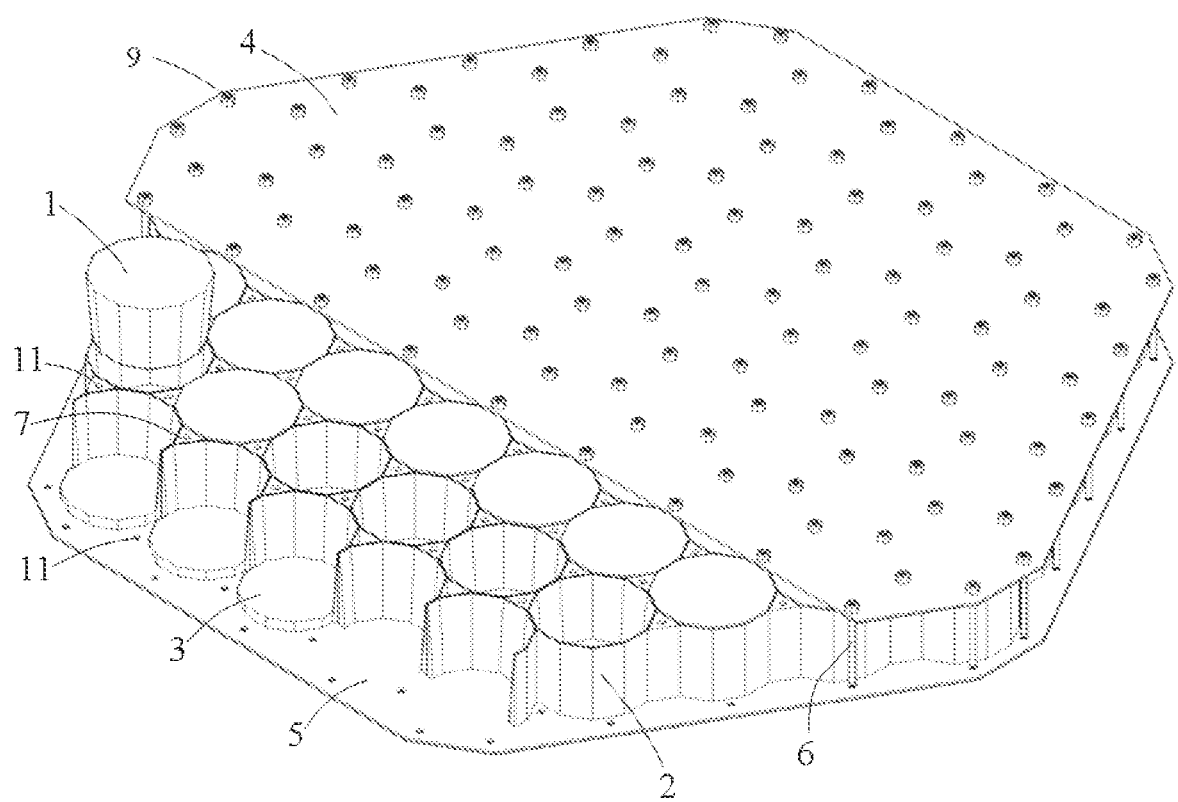
FIG. 7 is an internal structure assembly diagram of embodiment 4 of the present disclosure.
Figure 8:
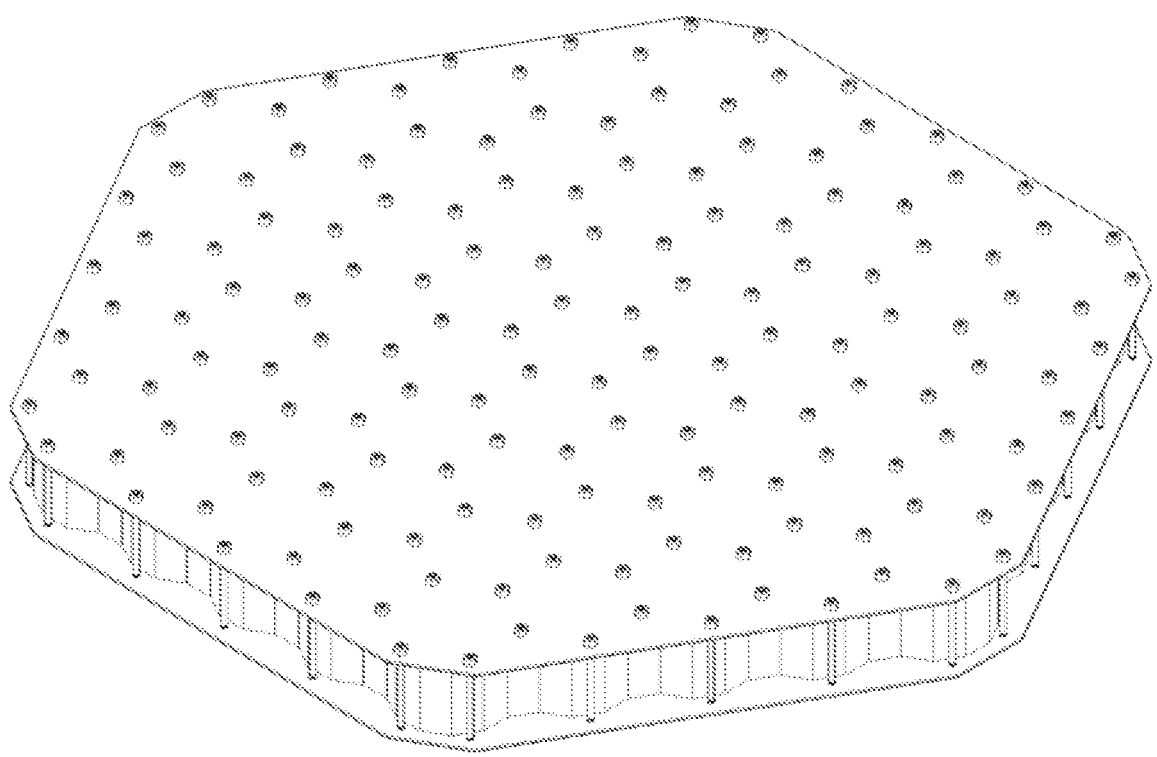
FIG. 8 is an external structure diagram of embodiment 4 of the present disclosure.

In this embodiment, the infill block is an infill block 1 in the shape of frustum of a regular dodecagonal pyramid, the restraint frame 2 takes the hoop in the shape of frustum of a regular dodecagonal pyramid as the basic unit, and a plurality of the infill blocks 1 in the shape of frustum of a regular dodecagonal pyramid and the restraint frame 2 are assembled into a hexagonal composite protective structure, as shown in FIG. 7. The hoop is anchored on the back plate 5 by bolts, or connected to the back plate 5 by welding or bonding. Buffer blocks 3 such as foam aluminum and foam polymer are filled at the bottom of the mounting hole of each hoop, and then the infill block 1 is pressed into the hoop in the restraint frame 2. The size of lateral confining prestress of the infill block 1 is controlled by controlling the pressing depth, so that the anti-penetration and anti-explosion performance of infill block 1 is optimal. Concrete, fiber reinforced polymer or foam aluminum and other materials are used as gap filler 7 for filling gaps between the hoops in the shape of frustum of a regular dodecagonal pyramid. The integral structure assembled by the back plate 5, the cover plate 4, the buffer block 3, the restraint frame 2 and the infill block 1 in the shape of frustum of a regular dodecagonal pyramid is shown in FIG. 8. The prestress in the direction perpendicular to the flat top of infill block 1 can be adjusted with the bolt tightness.

Embodiment 5

Figure 9:
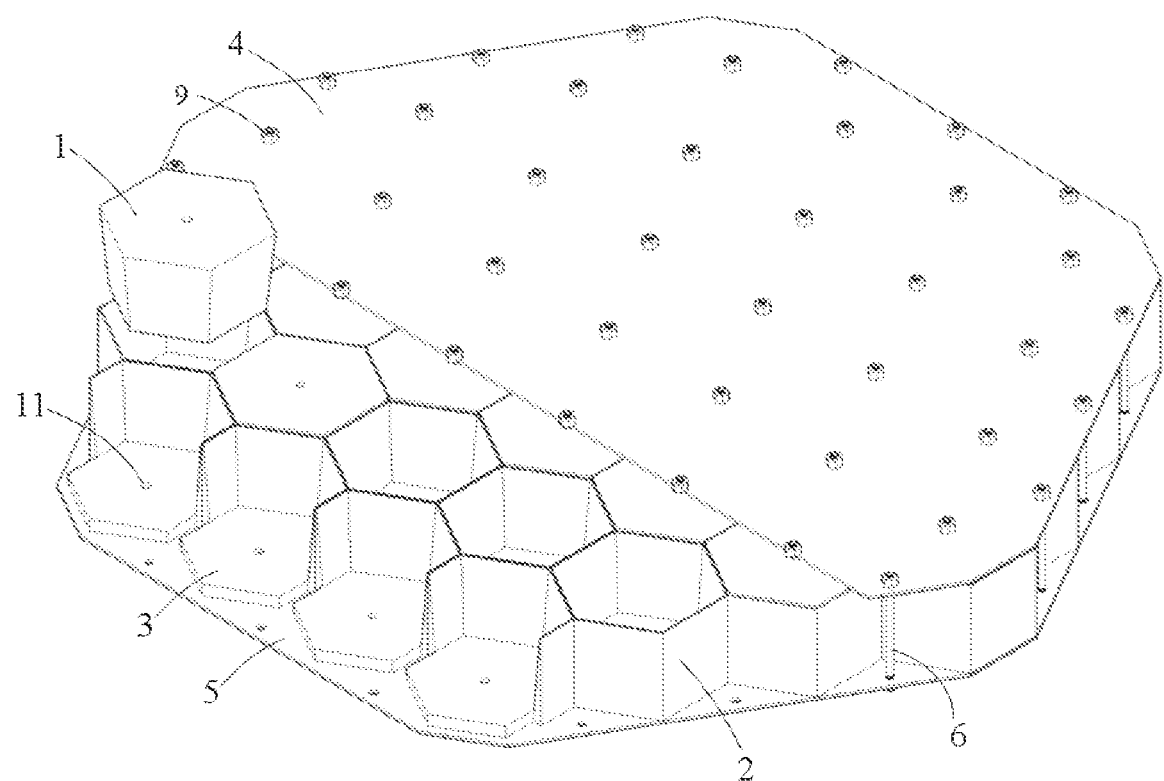
FIG. 9 is an internal structure assembly diagram of embodiment 5 of the present disclosure.
Figure 10:
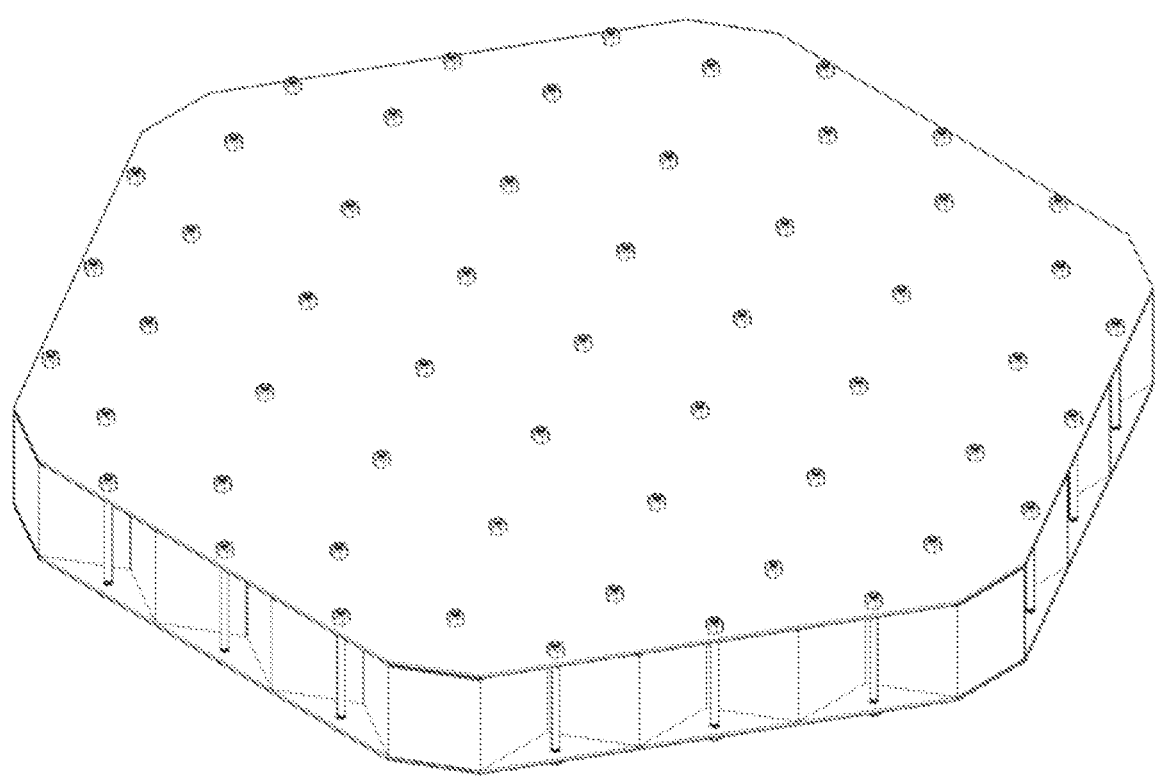
FIG. 10 is an external structure diagram of embodiment 5 of the present disclosure.

As shown in FIG. 9, the difference between this embodiment and Embodiment 1 is that in this embodiment, the overall structure is a hexagonal composite protective structure assembled by a plurality of infill blocks 1 in the shape of frustum of regular hexagonal pyramid and a restraint frame 2. The overall structure is shown in FIG. 10.

Embodiment 6

Figure 11:
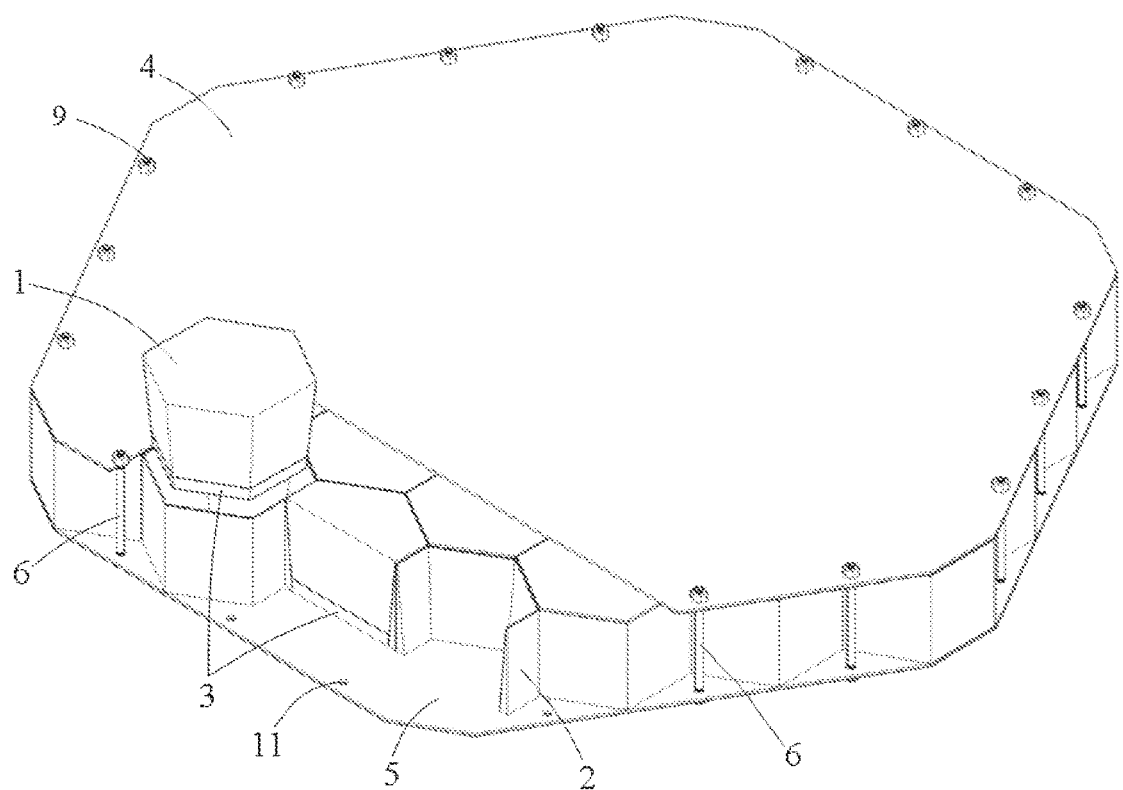
FIG. 11 is an internal structure assembly diagram of embodiment 6 of the present disclosure.
Figure 12:
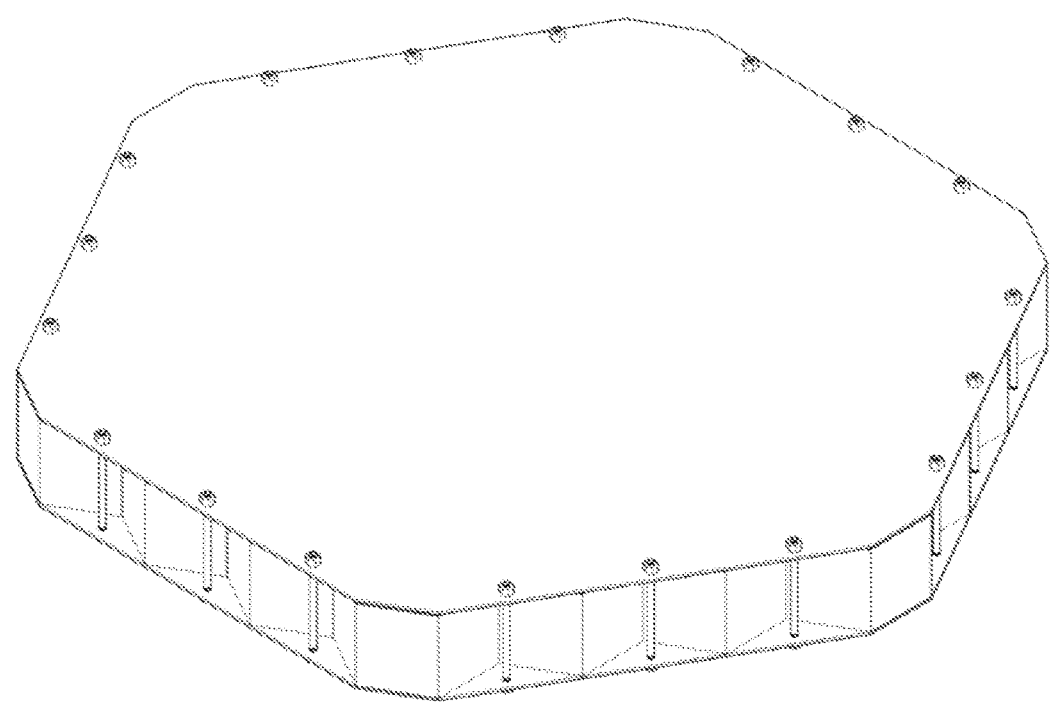
FIG. 12 is an external structure diagram of embodiment 6 of the present disclosure.

As shown in FIG. 11, this embodiment is based on Embodiment 5. The difference between the two is that bolt holes 11 are not set on infill block 1 in the shape of frustum of hexagonal pyramid and the buffer block 3 in this embodiment, and bolt holes are only set at the edges of the cover plate 4 and the back plate 5. The cover plate 4 and the back plate 5 are bonded with the infill block 1 by the binder, and the surrounding of the structure is connected with bolts. The embodiment is applicable to small protective structural members, such as small ceramic composite armor plate. The overall structure is shown in FIG. 12.

Embodiment 7

Figure 13:
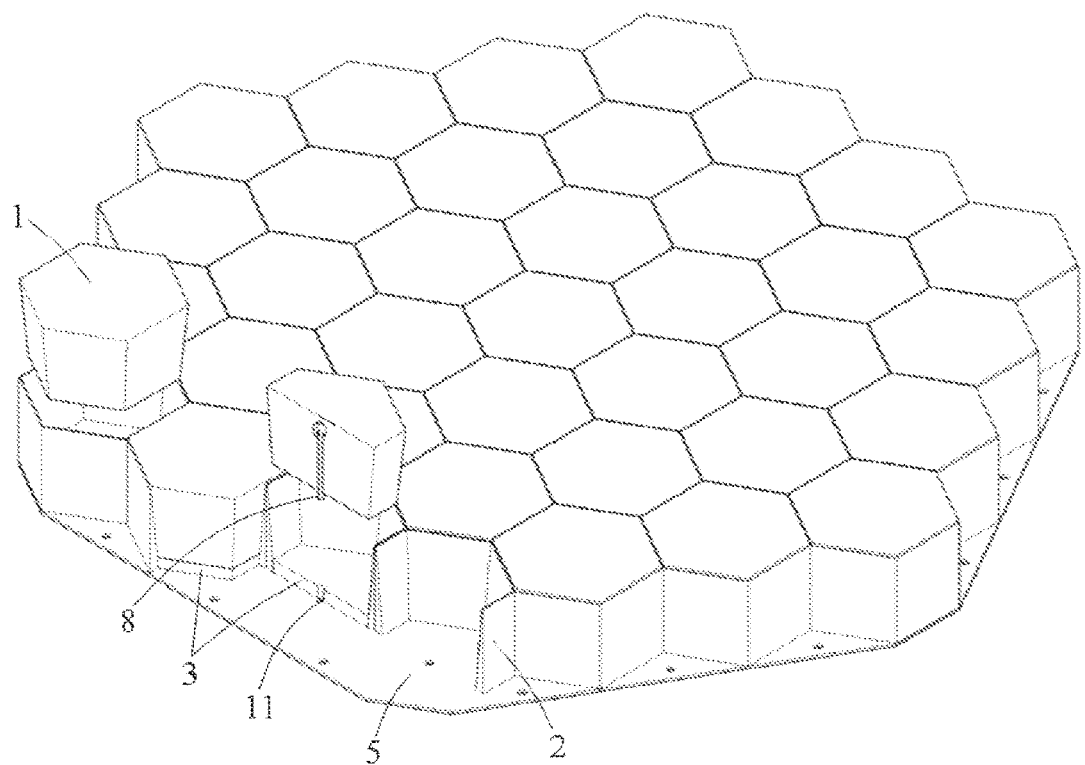
FIG. 13 is an internal structure assembly diagram of embodiment 7 of the present disclosure.
Figure 14:
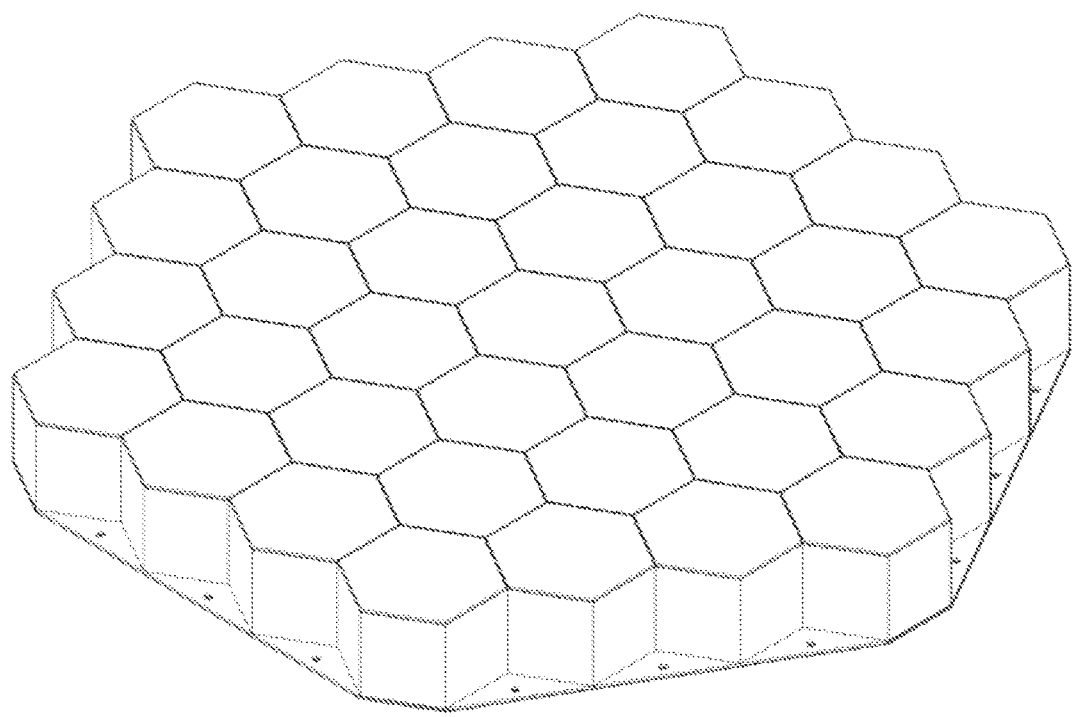
FIG. 14 is an external structure diagram of embodiment 7 of the present disclosure.

As shown in FIG. 13, the difference between this embodiment and Embodiment 5 is that the structure in this embodiment is not provided with a cover plate 4, but is anchored with the back plate 5 by embedded bolt anchor 8 in the infill block 1. The size of lateral confining prestress of infill block 1 is controlled by the fastening degree of embedded bolt anchor 8 and the back plate 5, and the overall structure is shown in FIG. 14. In this embodiment, the outer surface of the infill block 1 can be wrapped with fiber reinforced polymer or provided with metal plate materials for surface reinforcement, so the cover plate 4 may not be provided. In this embodiment, in order to enhance the structural integrity and the controllability of lateral confining prestress, more bolt anchors 8 can be embedded in the infill block 1.

In the above embodiments 1-5, each infill block 1 only reserves one bolt hole 11. However, in order to enhance the structural integrity and increase the size of the third direction prestress, more bolt holes 11 can be reserved on each infill block 1, or at least one bolt anchor 8 can be embedded in the infill block 1 to connect the back plate 5.

The shape of the fabricated composite protective structure in the above seven embodiments is not limited to rectangular or hexagonal shapes, such as doors, panels, walls, etc., but also can be assembled into circular shapes, such as missile well covers, or special-shaped shapes. The protective structure panel can also be assembled into cylindrical, spherical and other curved shapes. The shape of the restraint frame 2 and the number of infill blocks 1 are determined according to the actual working conditions. Except for Embodiment 3, the thickness of the infill block 1 in other embodiments can also be reduced parabola or linear from the mid-span region to the periphery according to the possible bending moment distribution.

What is claimed is:

1. A frustum embedded fabricated composite protective structure, comprising a restraint frame, a back plate, an infill block and a buffer block, wherein the restraint frame is arranged on the back plate, the infill block is in a frustum shape, the buffer block is arranged on the smaller end of the infill block, and the restraint frame is provided with a plurality of through holes matching a size of the infill block to form mounting holes, the buffer block and the infill blocks are installed in the mounting holes of the restraint frame, and the infill block is wedged into the mounting hole of the restraint frame through a wedge surface mating, while the buffer block is constrained at a bottom of the mounting hole, and the infill block, the buffer block and the back plate are fastened by fasteners;

the restraint frame is formed by connecting a plurality of hoops matching a shape of the infill block, and an inner cavity of each of the plurality of hoops forms the mounting hole;

a cover plate is arranged on an opening side of the restraint frame, the restraint frame is clamped between the back plate and the cover plate; the fasteners comprise bolts and nuts, and at least one bolt hole penetrates through the cover plate, the infill block, the buffer block and the back plate; and the cover plate and the back plate fixedly connect the infill block and the buffer block with each other through the bolts and the nuts.

2. The frustum embedded fabricated composite protective structure according to claim 1, wherein the shape of infill block is a frustum of hexagonal pyramid, a frustum of regular pyramid, a frustum of cone or a frustum of regular twelve pyramid.

3. The frustum embedded fabricated composite protective structure according to claim 1, wherein the gaps between the hoops are filled with a gap filler respectively.

4. The frustum embedded fabricated composite protective structure according to claim 3, wherein at least one bolt hole penetrates through the cover plate, the gap filler, and the back plate, and the cover plate, the gap filler and the back plate are fixedly connected with each other through the bolts and the nuts.

5. The frustum embedded fabricated composite protective structure according to claim 1, wherein the infill block is a single-layer or multi-layer structure, the infill block is composed of one or more materials from ceramics, concrete and glass, and an outer surface of the infill block is wrapped with fiber reinforced polymer or metal plate to form a surface reinforcement layer.

6. The frustum embedded fabricated composite protective structure according to claim 1, wherein inclined angles of the infill block and the hoop matching with the infill block ranges from 0.5° to 10°.

7. The frustum embedded fabricated composite protective structure according to claim 1, wherein a thickness of the infill block decreases from a centre of the restrained frame to a periphery in a parabola or linear form, and a thickness of the buffer block increases correspondingly with the decrease of the thickness of the infill block, so that a total thickness of the infill block and the buffer block in each mounting hole matches a depth of the mounting hole.

* * * * *